ADOLF G. BUTLER, INVENTOR.

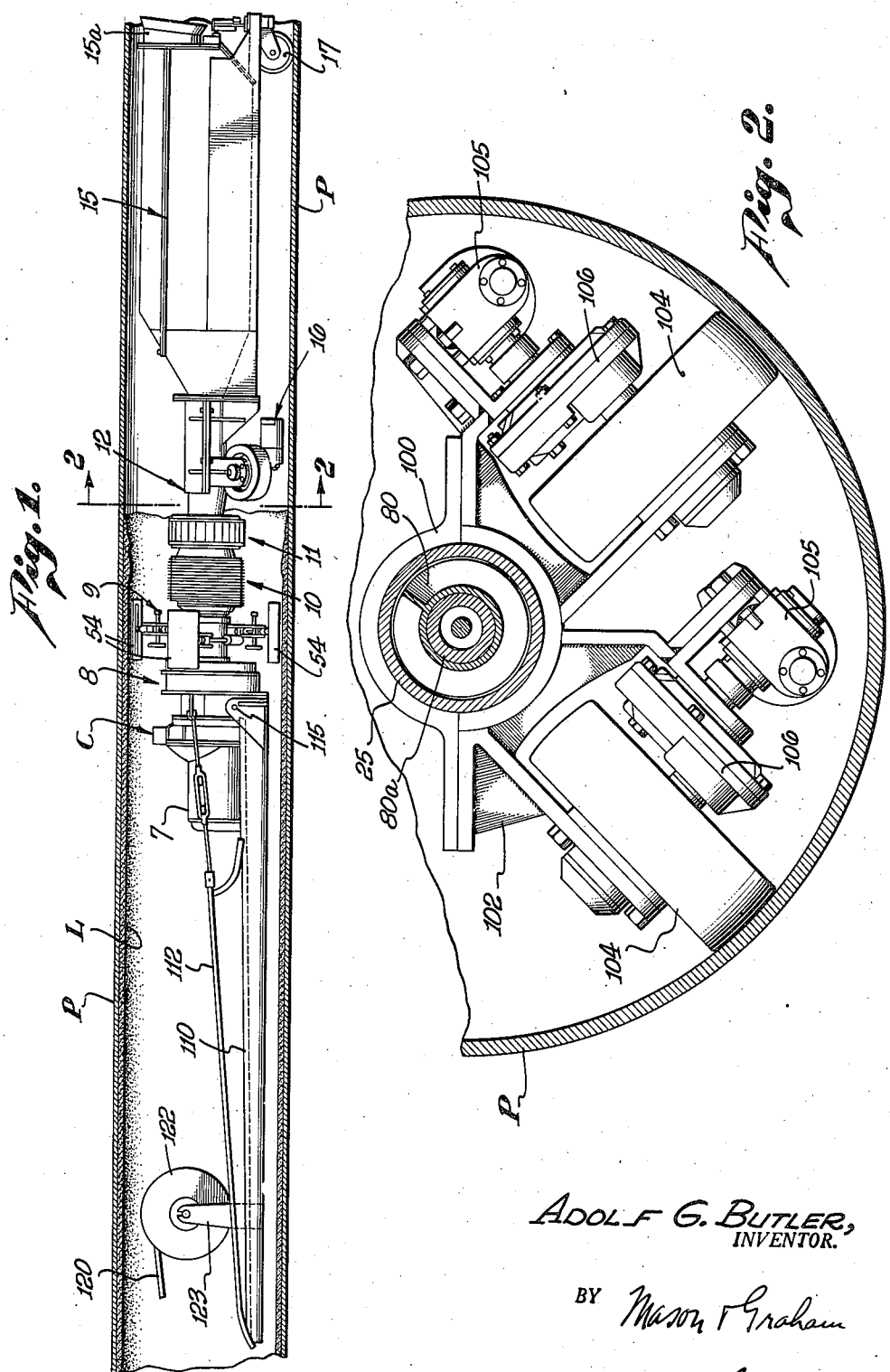

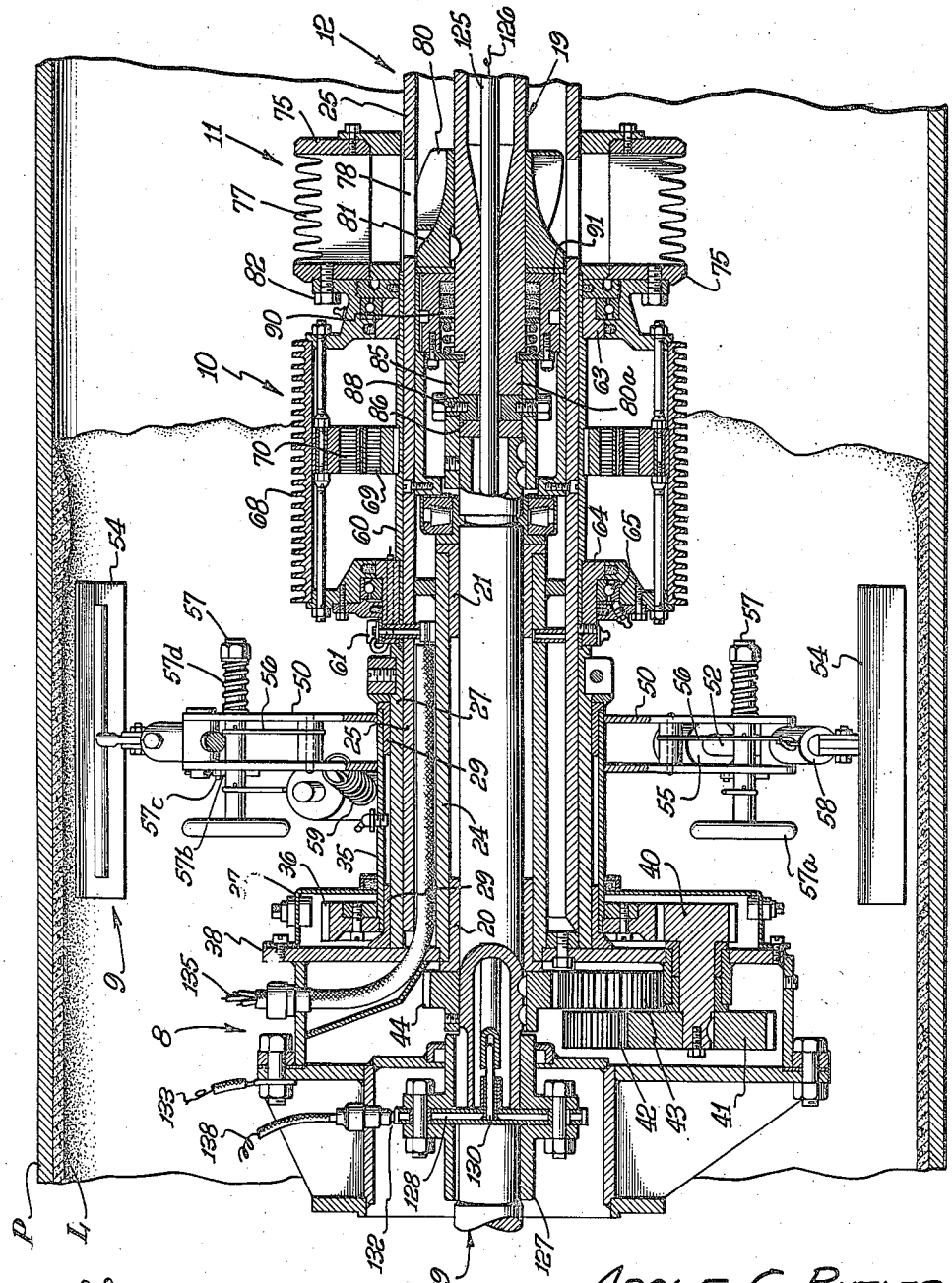

BY *Mason Graham*

ATTORNEY.

Patented Apr. 30, 1946

2,399,321

UNITED STATES PATENT OFFICE 2,399,321

PIPE LINING MACHINE

Adolf G. Butler, Hawthorne, Calif., assignor to American Pipe and Construction Co., Southgate, Calif., a corporation of Delaware Application May 14, 1945, Serial No. 593,753

4 Claims. (Cl. 25—38)

My present invention has to do with apparatus for applying protective lining or coating to the inner wall of a pipe, finding its chief utility in the lining with cement of pipes which have been laid in place for such purposes as water lines and the like.

While devices have been proposed and used for lining pipes, so far as I am aware they have been of such inherent construction and operation that there are rather serious limitations upon their use and upon the size of pipe in which they may be used. For instance, they consist generally of a cement hopper, a "flinger" for depositing a Portland cement mixture on the inner pipe wall by centrifugal action, a troweling member which follows the flinger, and power means for actuating the several elements. Such machines require constant attendance by an operator in the pipe and the operator must walk or crawl along the pipe ahead of the machine in order not to disturb the freshly deposited and troweled lining. The hopper must be frequently refilled with cement mix by means of a cart or other carrier which must approach the machine from its forward end in order not to disturb the freshly laid lining. Thus within the restricted confines of a pipe line it is difficult for the operator to move from between the cement supply carrier and the lining machine to permit transfer of the load to the hopper. Moreover, it is very tiring to the operator to have constantly to assume a stooped or crawling position along the pipe.

Another shortcoming of the prior devices has been the difficulty attending the assembling and disassembling of the machine within the pipe line, as often becomes necessary since such devices require frequent cleaning.

It is one of the principal objects of my present invention to provide a device for lining pipes which is so designed and constructed that it may be readily disassembled, cleaned and reassembled without removing it from the pipe line.

Another object of the invention is to provide a pipe lining device which is controlled by an operator who is carried in a comfortable working position on the trailing end of the machine without disturbing the freshly deposited lining, whereby leaving the forward end of the machine freely accessible for refilling the cement hopper from a carrier.

Another object is the provision of a pipe lining machine which, by virtue of its designed construction and operation, is capable of being used in pipes of smaller diameter than heretofore.

Among the more specific objects of the invention I aim to provide a device of this character whose parts consist, in the main, of concentric tubular elements capable of being assembled and disassembled by movement axially relative to each other whereby to permit assembly and disassembly within the confines of a relatively small pipe.

Another of the more specific objects of the invention is the provision of an operator-supporting platform suspended from the trailing end of the machine in position spaced from any contact with the pipe being worked upon, upon which platform the operator may recline and have readily accessible to him all the controls for the machine, whereby to permit operation of the machine within relatively small pipe without disturbing the deposited lining before it sets and without interfering with the recharging of the machine with cement mix.

Another object is the provision in such a machine of supporting wheels which are individually power driven and controlled by a pendulum rheostat, thereby accomplishing automatic steering as well as rendering it unnecessary to employ any objectionable large motors for the propulsion.

Another novel feature of my invention is the improved construction of the troweling element.

By way of example I shall now describe one of the specific and presently preferred embodiments of my invention by which I achieve the above stated objects, although I wish it understood that, within the broader scope of the invention as defined by the appended claims, the invention is capable of being carried out in other physical forms which the ensuing description will suggest to those working in this art.

For purposes of the following description I shall refer to the accompanying drawings, in which:

Fig. 1 is a side elevation showing the machine mounted within a pipe line, the pipe line being shown in longitudinal section;

Fig. 2 is a section on line 2—2 of Fig. 1;

Fig. 3 is an enlarged fragmentary longitudinal section of Fig. 1;

Figure 4:
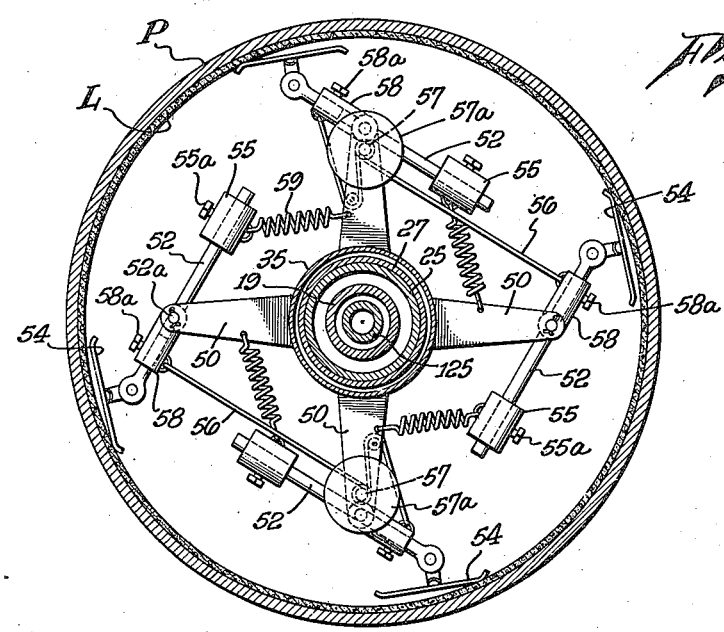
Fig. 4 is an enlarged sectional view showing the troweling assembly.

Referring now to the drawings I show in longitudinal section at P a pipe line in course of being lined by my machine, the troweled lining being shown at L and the untroweled, freshly deposited lining being shown immediately ahead or to the right of the troweled lining, and the machine being disposed within the pipe. The lining machine is comprised generally of an electric motor 7, a gear housing 8 carrying reduction gears, a troweling member 9, a flinger motor 10, a flinger 11, a screw conveyor housing 12 carrying an augur or screw conveyor, a material hopper 15, wheel unit 16, a caster 17, and a main drive shaft 19 (Fig. 3).

Drive shaft 19, whose left-hand end is operatively connected to motor 7, is journaled in bearings 20, 21 carried by tubular body element 24 concentrically nested within a stationary tube 25, the latter being mounted within a sleeve 27 carrying bearing members 29.

A sleeve 35 rotates on bearings 29 and forms the hub of troweling element 9 to be described. Sleeve 35 also carries a ring gear 36 rotating within housing 37, the latter being secured to flange 38 carried by tube 24.

Meshing with gear 36 there is a gear 40 which is operatively connected with shaft 19 by the train of gears denoted individually by the numerals 41, 42, 43, 44, the gear reduction thus effected being typically although not necessarily of the ratio 30:5.

The troweling device comprises four pairs of spaced, parallel, radial arms 50 carried by sleeve or hub 35, on the outer ends of which arms the respective trowel-supporting rods 52 are pivotally mounted. On the outer end of each rod there is pivotally mounted a trowel element 54, and on the opposite side of the pin 52a, by which each rod is pivoted to the arms, each rod carries a counterweight 55 which is axially adjustable along the rod, being held in adjusted position by set screw 55a. For retracting the trowels—that is, for withdrawing them from troweling contact with the pipe—I provide two cables 56, each of which is fixed on a spindle 57 slidably and rotatably carried by a pair of the arms 50 and carries a hand wheel 57a for manual operation. One end of each cable is fixed to a sleeve 58 adjustably carried by one of the rods 52, the latter sleeve being held in adjusted position by a set screw 58a. The other end of each cable is fixed to a like sleeve 58 on an adjacent rod 52. Thus it will be observed that clockwise rotation of a spindle 57 winds the cable about the spindle and withdraws a pair of trowels from engagement with the pipe against the pressure of springs 59 which urge the trowels against the pipe. Each spindle is locked against rotation in a counterclockwise direction by a detent 57b engaging against a fixed pin 57c carried by an arm 50, but may be released for counterclockwise rotation, to allow the trowels to move into engagement with the pipe, by sliding the spindle 57 axially, against compression spring 57d until detent 57b disengages from pin 57c. A sleeve 60 is fixed to tube 25, the sleeve 60 carrying a wire conduit 61 and carrying bearing mounting rings 63, 64, the latter carrying ball bearing races 65. Rotatably mounted on the bearings there is the rotor 68 of the flinger motor 10. The stator 69 of the motor is carried by the sleeve 60 while the armature 70 is carried by the rotor.

The flinger 11 is rotatably mounted upon tube 25 and consists of spaced rings 75 between which are disposed a plurality of radial vanes 77, the vanes being circumferentially spaced apart to provide outlet openings therebetween adapted upon rotation of the flinger to register with outlet slots 78 in the tube 25 as the flinger rotates relative to the tube. A screw conveyor 80 operatively secured to shaft 19 moves plastic cement material from the hopper 15, delivering it against the curved deflecting collar 81 carried by the inner end portion 80a of the conveyor. The flinger is secured to the rotor of the motor 10 by screws 82 so as to rotate therewith.

The inner or left-hand end of the conveyor shaft 80a is operatively connected to the main drive shaft 19 by means of collar 85 which has bayonet slots 86 into which radial members 88 carried by the conveyor shaft fit. Spring-loaded mud seals 90 are provided between the conveyor shaft and bearing 91.

Secured by semi-circular clamp members 100 to the right-hand end portion of tube 25 is the wheel mounting frame 102 carrying a pair of wheels 104, a pair of D. C. motors 105 and a gear housing 106 carrying gears drivingly connecting the respective motors to the respective wheels. A caster 17 is pivotally secured to the hopper member 15, so that the entire machine has a three-point support provided by the wheels 104 and the caster 17. The wheels 104 are disposed at an angle to each other or radial to the longitudinal axis of the machine, to provide a more effective support for the machine and to permit it to roll along the curved wall of the pipe 5.

For supporting and carrying the operator I provide a platform 110 suspended from the trailing end of the machine by means of rods 112 and trunnions 115. The weight of that portion of the machine to the right of the trunnions is sufficient to maintain the platform suspended above the surface of the lining L even with the added weight of an occupant reclining on the platform. The control box C carrying the controls for motors 7, 10 and 105 is positioned so as to be accessible to an operator reclining face down on the platform.

Inasmuch as the machine is rolled longitudinally along the pipe in the course of its operation, it is connected to the A. C. and D. C. electrical sources outside the pipe by wires 120 carried on a reel 122, the reel being rotatably supported by bracket 123 carried by the platform.

A conduit 125 is mounted longitudinally in hollow shafts 19 and 80a and carries wire 126 conductively connected to the wheel motors through the pendulum rheostat 124. To connect the wire to a source of direct current a collar 127 is secured on the left-hand end of shaft 19 and carries conductor 128 conductively connected by plug 130 to the wire extending through conduit 125. A brush element 132 connects wire 138 with the source while a wire 133 is grounded to the body. For operating the flinger motor, alternating current is supplied through wires 135. Conventional electrical connection, not shown, is made to motor 7.

Figure 5:
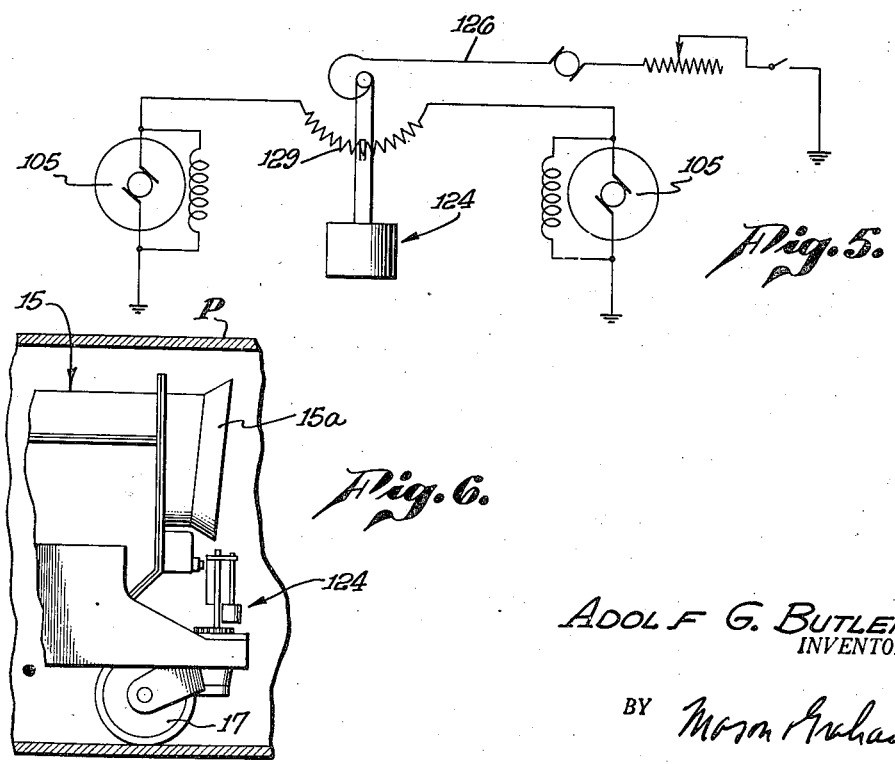
Fig. 5 is a diagram showing the wheel-operating circuit.
Figure 6:
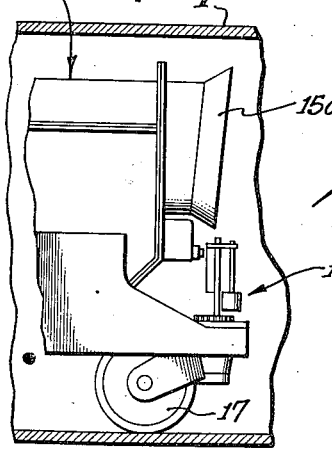
Fig. 6 is an enlarged fragmentary side elevation showing the pendulum switch.

The circuit means for energizing and controlling the wheel motors 105 is shown diagrammatically in Fig. 5. Here the wire 126 leads through the swingable pendulum 124, rheostat 129 and wires 131 to motors 105. Thus, if the machine should move out of axial alignment with the pipe, it will tilt sidewise due to the curvature of the pipe and the relative speeds of the motors 105 will be automatically varied in opposite senses as will restore the axial alignment.

The novelty, cooperation and function of the parts will be best understood from the following description of operation of the hereinabove described machine.

First, the hopper 15 is initially charged with a plastic mix of, for instance, Portland cement, through the inlet 15a. Inasmuch as the inlet 15a is unobstructed by any operator positioned between the hopper and filling truck or carriage, not shown, filling of the hopper is greatly facilitated.

Then the operator, reclining on the platform 110, starts the motor 7 which rotates the conveyor to move the plastic cement mix from the hopper to the flinger, starts motor 10 to operate the flinger, thus causing the cement mix to be centrifugally thrown by the flinger against the inner surface of the pipe. The motor 7 also rotates the troweling element 9 to trowel the deposited lining until it presents a smooth surface. By proper control of the current to the rheostat 129, the desired speed of travel of the machine is maintained and the machine is automatically steered in a straight line along the pipe. In other words, if the machine should deviate from such line, it is instantly righted by the pendulum-actuated rheostat. An additional and important advantage derived from the use of individual motor drives for the wheels is the fact that relatively small motors may be used and, when arranged symmetrically about the longitudinal axis of the machine, occupy a minimum of space, thus enabling the machine to operate in a smaller diameter pipe than would otherwise be the case.

The coaxial elements constituting the working parts may be readily disassembled and reassembled within the pipe since no material part has to be removed or applied laterally.

I claim:

1. Apparatus for lining pipe walls with a coating of plastic material, comprising a carriage movable longitudinally along the pipe interior, a material reservoir, power-operated flinger means on the carriage operable to centrifugally deposit material on the inner surface of the pipe, feed means for conveying material from the reservoir to the last-named means, said reservoir having a filling opening at the forward end of the carriage, power-operated means on the carriage rearwardly of the flinger means for troweling the deposited material, control means on the trailing end portion of the carriage operatively associated with said power-operated means, and a man-supporting platform suspended from the trailing end of the carriage.

2. In apparatus for lining pipe walls with a coating of plastic material, having a carriage movable longitudinally along the pipe interior and driven members for depositing and troweling material on the pipe interior, means for supporting an operator comprising a platform adapted to be suspended from the trailing end of the carriage in position spaced from the deposited and troweled lining, said platform being shaped to support a person in reclining position.

3. In apparatus for lining pipe walls with a coating of plastic material, having a carriage adapted to move axially of the pipe and supported at three points of contact with the pipe by a pivoted caster and a pair of individually motor-driven wheels disposed radial to the carriage; pendulum actuated means for relatively changing the speeds at which the wheels are driven in response to movement of the carriage into position out of axial alignment with the pipe, and means on the carriage for depositing plastic material on the inner surface of the pipe.

4. In apparatus for lining pipe walls with a coating of plastic material, having a carriage adapted to move axially of the pipe and supported at three points of contact with the pipe by a pivoted caster and a pair of individually motor-driven wheels disposed radial to the carriage; pendulum actuated electrical means for relatively changing the speeds at which the wheels are driven in response to movement of the carriage into position out of axial alignment with the pipe, and means on the carriage for depositing plastic material on the inner surface of the pipe.

ADOLF G. BUTLER.